United States Patent [19]

Heintz

[11] 3,845,983
[45] Nov. 5, 1974

[54] REMOVABLE COWLING COVER FOR VEHICLES

[76] Inventor: Richard D. Heintz, 38305 56th St., Des Moines, Iowa 50310

[22] Filed: June 26, 1973

[21] Appl. No.: 373,622

[52] U.S. Cl. .................................................. 296/84
[51] Int. Cl. .............................................. B60j 1/20
[58] Field of Search ............. 296/28 R, 28 G, 84 R; 15/250.16, 250.17, 250.19; 292/251.5; 220/55 MG

[56] References Cited
UNITED STATES PATENTS

| | | | |
|---|---|---|---|
| 2,058,923 | 10/1936 | Swallow | 296/28 G |
| 2,639,751 | 5/1953 | Flaherty | 292/251.5 |
| 2,761,370 | 9/1956 | Rhoades | 296/28 G |
| 2,895,157 | 7/1959 | Kocourek | 15/250.16 X |
| 3,244,329 | 4/1966 | Cates | 292/251.5 X |

Primary Examiner—Stanley H. Tollberg
Assistant Examiner—Norman L. Stack, Jr.
Attorney, Agent, or Firm—Clarence A. O'Brien; Harvey B. Jacobson

[57] ABSTRACT

A panel member of a size, shape and contour for disposition over at least that cowl portion of a vehicle body having air intake openings formed therein. The cover includes peripherally extending magnetic strips secured to its undersurface whereby the cover will be magnetically attracted to and thus secured on the underlying vented cowl portion and the magnetic strips further serve as seal strips to reduce the possibility of ventilation air passing between the marginal edges of the cover and the cowl for entrance through the air intake openings.

5 Claims, 4 Drawing Figures

PATENTED NOV 5 1974  3,845,983

REMOVABLE COWLING COVER FOR VEHICLES

There are many locales which are dusty and which generate considerable dust when vehicles are driven therethrough. Such locales include dry farm land areas, construction areas and sandy areas, etc. Many passenger vehicles are provided with cowl portions disposed immediately forward of the lower marginal edge portions of the vehicle windshields and these cowl portions include air intake openings or slots for intaking fresh air to the ventilation, heater and/or air conditioning system of the vehicle. While many of these air inlets include valves or dampers and the like which may be closed and which are disposed downstream from the cowl air intake openings; although these valves or dampers preclude the entrance of dust or sand into the air intake systems downstream from the valve or dampers, dust and/or sand is free to collect in heavy deposits between the air inlet openings and the valves or dampers with the result that even though a person may drive through a dusty or sandy area with his valve or damper closed to preclude the entrance of dust and/or sand into the passenger compartment of the vehicle while driving through such sandy or dusty areas, if the operator of a vehicle subsequently opens the control damper or control valve the dust and/or sand collected upstream from the valve or damper is then blown through the air induction system.

Accordingly, the cover of the instant invention has been provided to enable the operators of vehicles to cover the air intake openings of the passenger compartment air induction systems when vehicles are driven through dusty and/or sandy areas.

The field choppings such as ensilage, grain, wheat, oats, chaff and straw cause most of the plugging up of ducts. Ducts are designed to stand normal field dust conditions. This invention protects against the difficulties caused in normal field operations due to field choppings.

The main object of this invention is to provide a cover which may be readily placed and secured in position over the air intake openings or slots formed in the cowl portions of some passenger vehicles for the purpose of precluding the entrance of dust, sand, or in an area where field chopping is being carried out, and field choppings into the air induction system through the cowl slots or openings.

Another object of this invention, in accordance with the immediately preceding object, is to provide a cover which will automatically be removably secured in position upon placement of the cover in position closing the cowl air intake openings.

Another important object of this invention is to provide a cover in accordance with the preceding objects and which may be readily modified so as to be adaptable for use on vehicles of different manufacture.

Still another object of this invention is to provide a cover construction which may be constructed of various materials such as canvas, aluminum, plastic, nylon or fiber glass and yet still readily removably secured in position in the same manner on the associated vehicle.

A final object of this invention to be specifically enumerated herein is to provide a cowl air intake cover in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
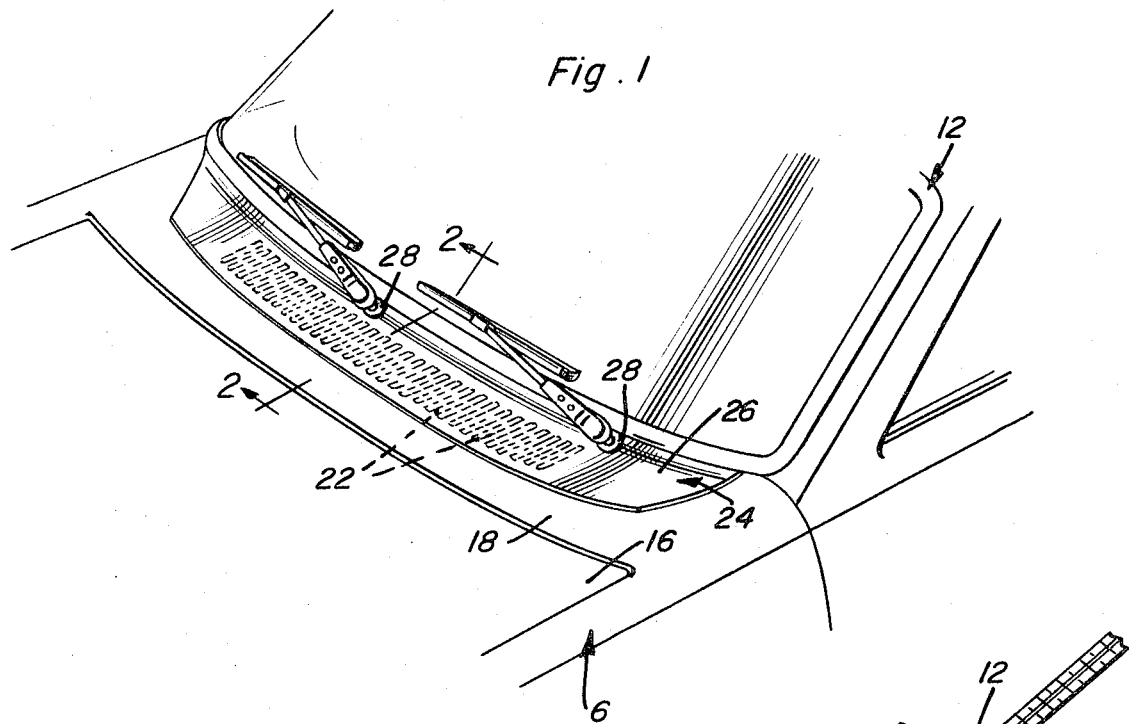
FIG. 1 is a fragmentary perspective view of a conventional form of passenger vehicle having a cowl portion disposed immediately forward of the lower marginal edge portion of the vehicle windshield and with the cover of the instant invention in position over the cowl portion closing the air intake openings formed in the cowl portion.

Referring now more specifically to the drawings, the numeral 10 generally designates a conventional form of vehicle including a forward windshield assembly referred to in general by the reference numeral 12, a front hood portion 16 and a cowl portion 18 disposed immediately forward of the lower marginal edge portion of the windshield assembly 12 and extendinng between the latter and the rear marginal edge portion of the hood 16.

The cowl portion 18 includes an underlying air intake plenum 20 and is provided with a plurality of transversely spaced slots 22 defining air intake openings for the plenum 20. Of course, the plenum 20 may supply air to the fresh air ducts (not shown), the air heating system (not shown) and/or the air conditioning system (not shown) of the vehicle 10.

Figure 2:
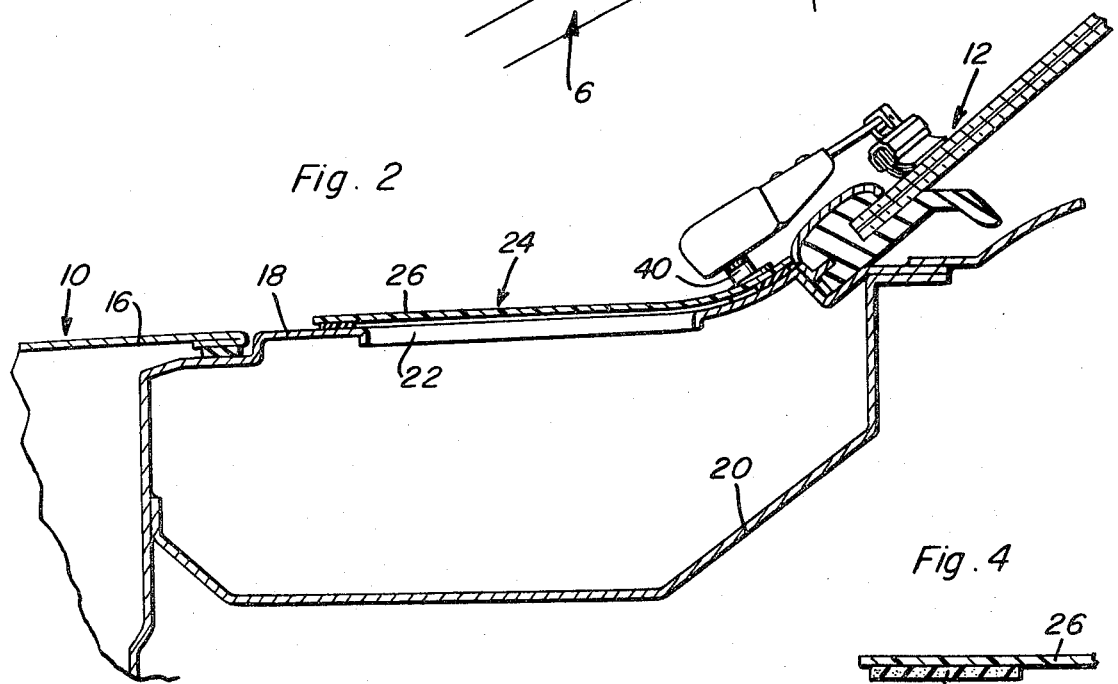
FIG. 2 is an enlarged fragmentary vertical sectional view taken substantially upon the plane indicated by the section line 2—2 of FIG. 1.
Figure 4:
FIG. 4 is an enlarged fragmentary vertical sectional view of one marginal portion of the cowl cover illustrating the manner in which the magnetic attaching strips are positioned on the underside of the cover.

It is believed that it may be appreciated from FIG. 2 of the drawings that the plenum is subject to an accumulation of dust and/or sand when the vehicle 10 is driven through a dusty and/or sandy area. Accordingly, even though the heater, fresh air or air conditioning system of the vehicle 10 may include valves or dampers which may be closed to terminate communication between the plenum and these various air intake systems in the event the vehicle 10 is driven through dusty or sandy areas, the dust and sand which accumulates in the plenum 20 upstream from the valves or dampers will subsequently be blown into the interior of the vehicle 10 when the valves or dampers are opened after having driven through the sandy or dusty areas. Accordingly, a cover referred to in general by the reference numeral 24 is provided and is removably secured in position over that portion of the cowl 18 having the intake openings or slots 22 formed therein. The cover 24 comprises a panel-like body 26 which may be constructed of any suitable material such as canvas, aluminum, plastic, nylon or fiber glass. The particular material selected for the construction of the panel-like body 26 may be determined by the shape or deposition of the cowl 18 and its openings or slots 22 or the material of which the body 26 is to be constructed may be selected from an aesthetic or ease in storage standpoint, flexible material such as canvas and nylon rendering the body 26 readily foldable for compact storage.

In any event, the body 12 will be constructed of a flexible material or a stiff material which is contoured so as to be positionable over that portion of the cowl 18 having the air intake slots or openings 22 formed therein and with the body 26 conforming to the contour of the cowl 18. Flexible magnetic strips 28, 30, 32, 34 and 36 are secured to the underside of the body 26 in any convenient manner such as by adhesive and the strips serve to magnetically removably attach the body 26 to the outer surface of the cowl 18 against dislodgement therefrom due to wind while the vehicle 10 is moving at high speed.

If for any reason the cowl 18 is constructed of a non-ferrous material, other suitable means may be utilized to secure the marginal portions of the body 26 to the cowl.

Figure 3:
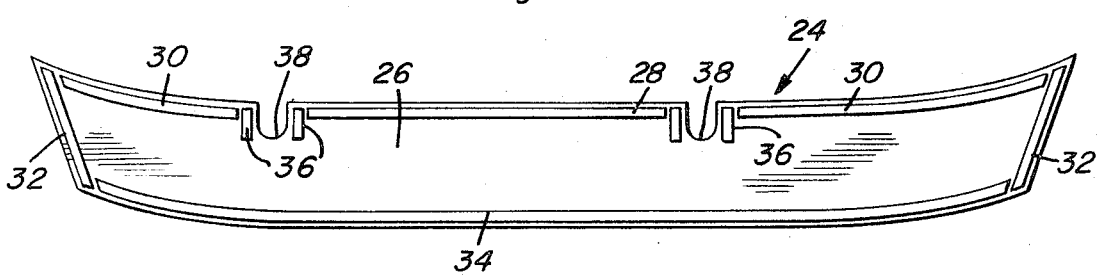
FIG. 3 is a bottom plan view of the cover.

From FIGS. 1 and 3 of the drawings it will be noted that the rear marginal edge portion of the body 26 is provided with transversely spaced notches 38. The notches 38 are provided to receive the output shaft portions 40 of the windshield wiper drive motors (not shown). It will therefore be understood that the notches 38 may be placed anywhere along the rear marginal edge portion of the body 26 in order to conform with the spacing of the rotary output shafts 40 of the particular vehicle 10 on which the cover 24 is to be used.

With the cover 24 installed as illustrated in FIGS. 1 and 2 of the drawings before entering an area where field chopping or similar activities are being carried on, the entrance of dust and/or sand and/or field choppings into the plenum 20 is prevented and thus when the air valves or dampers previously mentioned are opened subsequent to the vehicle driving through a sandy and dusty area and the removal of the cover 24 there will be no buildup of field chopping and/or sand and dust in the plenum to be blown into the interior of the vehicle 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle of the type including a windsheild assembly, a cowl body portion extending transversely of said vehicle forwardly of the lower marginal edge of the windshield assembly and a hood disposed immediately forwardly of said cowl body portion, said cowl body portion having ventilation air intake openings formed therein, a removable stiff and shape retentive cover for said air intake openings to prevent the precipitation of dust and other foreign airborne particles through said openings when the vehicle is stationary in a dusty atmosphere or being driven through a dusty region said said cover being panel-like in configuration and of a plan size and shape to completely cover at least the area of said cowl in which said intake openings are formed and to be devoid of portions thereof covering any portions of said hood and windshield assembly, said panel-like cover also being contoured to conform to and closely overlie the outer surface of said cowl area, said cover and cowl including coacting means removably securing said cover in position over said cowl area said cowl including a pair of upwardly projecting motor oscillatable windshield wiper arm support shafts, said cover including a rear marginal edge portion having a pair of edgewise outwardly opening notches formed therein through which said shafts project.

2. The combination of claim 1 wherein said means removably securing said cover in position comprises magnetic strips secured to and extending about a substantial portion of the periphery of said cover, said cowl being constructed of ferrous material to which said strips are magnetically attracted.

3. The combination of claim 2 wherein said strips extend substantially fully about the marginal edges of said cover and define seal strips forming at least a reasonably good seal area against the entrance of dust.

4. The combination of claim 1 wherein said means removably securing said cover in position comprises magnetic strips secured to and extending about a substantial portion of the periphery of said cover, said cowl being constructed of ferrous material to which said strips are magnetically attracted.

5. The combination of claim 4 wherein said strips extend substantially fully about the marginal edges of said cover and define seal strips forming at least a reasonably good seal area against the entrance of dust.

* * * * *

UNITED STATES PATENT OFFICE
CERTIFICATE OF CORRECTION

Patent No. 3,845,983    Dated November 5, 1974

Inventor(s) RICHARD D. HEINTZ

It is certified that error appears in the above-identified patent and that said Letters Patent are hereby corrected as shown below:

In the street address in the heading delete "38305 56th St.," and insert -- 3830 56th St., --.

Signed and sealed this 7th day of January 1975.

(SEAL)
Attest:

McCOY M. GIBSON J .         C. MARSHALL DANN
Attesting Officer           Commissioner of Patents